United States Patent
Suyama et al.

(10) Patent No.: US 10,044,082 B2
(45) Date of Patent: Aug. 7, 2018

(54) ELECTROLYTE FOR IRON-AIR BATTERIES AND IRON-AIR BATTERY

(71) Applicant: Toyota Jidosha Kabushiki Kaisha, Toyota-shi, Aichi-ken (JP)

(72) Inventors: Hiroshi Suyama, Mishima (JP); Kazushi Wakayama, Susono (JP); Tomohiro Kuroki, Susono (JP)

(73) Assignee: Toyota Jidosha Kabushiki Kaisha, Tokyo-shi (JP)

(*) Notice: Subject to any disclaimer, the term of this patent is extended or adjusted under 35 U.S.C. 154(b) by 93 days.

(21) Appl. No.: 15/258,487

(22) Filed: Sep. 7, 2016

(65) Prior Publication Data

US 2017/0077571 A1    Mar. 16, 2017

(30) Foreign Application Priority Data

Sep. 10, 2015 (JP) ................. 2015-178882

(51) Int. Cl.

| | | |
|---|---|---|
| *H01M 12/08* | (2006.01) | |
| *H01M 4/38* | (2006.01) | |
| *H01M 12/06* | (2006.01) | |
| *H01M 4/52* | (2010.01) | |
| *H01M 4/525* | (2010.01) | |
| *H01M 4/24* | (2006.01) | |

(52) U.S. Cl.
CPC ............ *H01M 12/08* (2013.01); *H01M 4/38* (2013.01); *H01M 12/06* (2013.01); *H01M 12/065* (2013.01); *H01M 4/248* (2013.01); *H01M 4/52* (2013.01); *H01M 4/521* (2013.01); *H01M 4/525* (2013.01); *H01M 2300/0002* (2013.01); *H01M 2300/0014* (2013.01); *Y02E 60/128* (2013.01)

(58) Field of Classification Search
CPC ..... H01M 12/06; H01M 12/065; H01M 12/08
See application file for complete search history.

(56) References Cited

U.S. PATENT DOCUMENTS

| 4,095,015 A | 6/1978 | Siwersson et al. | |
|---|---|---|---|
| 2009/0104463 A1* | 4/2009 | Egli ................... | C25D 3/58 428/457 |
| 2012/0082922 A1 | 4/2012 | Yamaki et al. | |

(Continued)

FOREIGN PATENT DOCUMENTS

| JP | S5132925 A | 3/1976 |
|---|---|---|
| JP | 2012094509 A | 5/2012 |

OTHER PUBLICATIONS

Hang, Bui Thi et al. "The effect of additives on the electrochemical properties of Fe/C composite for Fe/air battery anode", Journal of Power Sources 155 (2006) 461-469.

*Primary Examiner* — Scott J. Chmielecki
(74) *Attorney, Agent, or Firm* — Dinsmore & Shohl LLP

(57) ABSTRACT

An electrolyte for iron-air batteries, which is able to increase the discharge capacity of iron-air batteries without concentration control, and an iron-air battery using the electrolyte. The electrolyte for iron-air batteries having an anode containing an iron element may comprise an aqueous solution comprising a discharge reaction promoter containing at least one kind of anion selected from the group consisting of $SCN^-$ anions, $S_2O_3^{2-}$ anions and $(CH_3)_2NCSS^-$ anions.

10 Claims, 1 Drawing Sheet

(56) References Cited

U.S. PATENT DOCUMENTS

| | | | |
|---|---|---|---|
| 2013/0202974 A1* | 8/2013 | Mizuno | H01M 4/86 |
| | | | 429/405 |
| 2015/0228965 A1* | 8/2015 | Ushiroda | C01B 33/24 |
| | | | 429/217 |
| 2015/0349326 A1* | 12/2015 | Miyazaki | H01M 4/505 |
| | | | 429/220 |
| 2016/0240890 A1* | 8/2016 | Park | H01M 10/399 |
| 2017/0018828 A1* | 1/2017 | Suyama | H01M 12/08 |

* cited by examiner

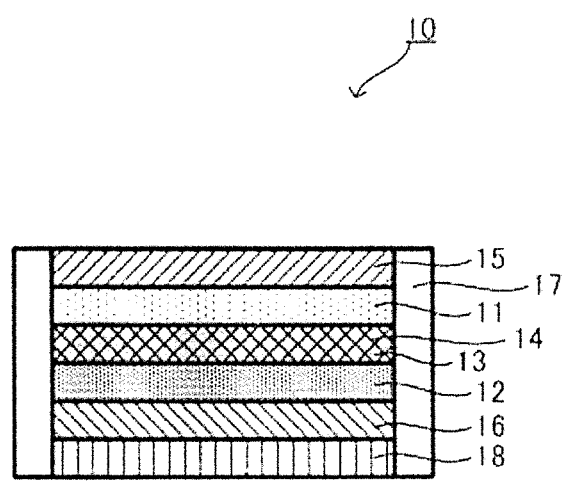

ELECTROLYTE FOR IRON-AIR BATTERIES AND IRON-AIR BATTERY

CROSS-REFERENCE TO RELATED APPLICATION

This application claims priority to Japanese Patent Application No. 2015-178882 filed on Sep. 10, 2015, the entire contents of which are hereby incorporated by reference into the present application.

TECHNICAL FIELD

The disclosure relates to an electrolyte for iron-air batteries, and an iron-air battery.

BACKGROUND

An air battery in which oxygen is used as an active material, has many advantages such as high energy density. Well-known examples of air batteries include metal-air batteries such as an iron-air battery and an aluminum-air battery.

As a technique relating to such air batteries, an iron-air battery including a cathode (air electrode), an electrolyte and an anode containing an iron metal, is disclosed in Patent Document 1 (Japanese Patent Application Laid-Open No. 2012-094509), for example.

However, the surface of the iron anode used in an iron-air battery is generally covered with an oxide layer (passivation layer) and problematic in that the iron anode is inactive as a battery electrode. To remove the passivation layer, generally, a reduction treatment is carried out before discharge. The surface of the iron anode is activated by this treatment.

However, there is a problem as follows: due to the influence of dissolved oxygen, hydroxides and so on in the electrolyte, the iron anode surface is re-passivated just after the reduction treatment and makes it difficult to obtain discharge capacity.

To prevent the iron anode surface from re-passivation, it is disclosed in Patent Document 1 that a decrease in electrode activity can be inhibited and a discharge reaction can be promoted by adding potassium sulfide ($K_2S$) to the electrolyte.

In the case of using the electrolyte containing $K_2S$, the discharge capacity of the iron-air battery can be increased. However, the discharge capacity significantly changes as the concentration of $K_2S$ changes. Accordingly, there is such a problem that highly accurate concentration control is necessary to obtain desired discharge capacity.

SUMMARY

The disclosed embodiments were achieved in light of the above circumstance. An object of the disclosed embodiments is to provide an electrolyte for iron-air batteries, which is able to increase the discharge capacity of iron-air batteries without concentration control, and an iron-air battery using the electrolyte.

In a first embodiment, there is provided an electrolyte for iron-air batteries having an anode containing an iron element. The electrolyte comprises an aqueous solution comprising a discharge reaction promoter containing at least one kind of anion selected from the group consisting of $SCN^-$ anions, $S_2O_3^{2-}$ anions and $(CH_3)_2NCSS^-$ anions.

The discharge reaction promoter may comprise at least one kind of cation selected from the group consisting of $Li^+$ cations, $K^+$ cations, $Na^+$ cations, $Rb^+$ cations, $Cs^+$ cations and $Fr^+$ cations.

The discharge reaction promoter may be $Na_2S_2O_3$.

A concentration of the discharge reaction promoter may be in a range of 0.005 mol/L to 0.1 mol/L.

The aqueous solution may be basic.

The aqueous solution may comprise KOH as an electrolyte compound.

In another embodiment, there is provided an iron-air battery comprising an air electrode configured to receive an oxygen supply, an anode containing an iron element, and an electrolyte as set forth above, the electrolyte being in contact with the air electrode and the anode.

According to the disclosed embodiments, an electrolyte for iron-air batteries, which is able to increase the discharge capacity of iron-air batteries without concentration control, and an iron-air battery using the electrolyte is provided.

BRIEF DESCRIPTION OF THE DRAWING

FIG. 1 is a sectional view of a schematic configuration of the iron-air battery according to one or more embodiments disclosed and described herein.

DETAILED DESCRIPTION

1. Electrolyte for Iron-Air Batteries

The electrolyte for iron-air batteries according to the disclosed embodiments is an electrolyte for iron-air batteries having an anode containing an iron element, the electrolyte comprising an aqueous solution comprising a discharge reaction promoter containing at least one kind of anion selected from the group consisting of $SCN^-$ anions, $S_2O_3^{2-}$ anions and $(CH_3)_2NCSS^-$ anions.

When $K_2S$ is added to an electrolyte, there is a problem as follows: battery discharge reactivity significantly decreases once the concentration of $K_2S$ in the electrolyte exceeds 0.01 mol/L.

Accordingly, as the amount of the electrolyte decreases by charge and discharge of a battery, the $K_2S$ concentration in the electrolyte increases. Once the $K_2S$ concentration in the electrolyte exceeds 0.01 mol/L, battery discharge reactivity (discharge capacity) significantly decreases. There is a problem in that to prevent the decrease in discharge capacity, highly accurate concentration control is necessary at the time of discharge.

Also, there is another problem in that the influence of variations in the concentration of the discharge reaction promoter at the time of electrolyte preparation, makes it difficult to provide a battery with stable quality.

It is considered that by adsorbing onto an iron anode surface, sulfide ions contribute to the inhibition of re-passivation of iron and to the inhibition of hydrogen generation upon charging. Accordingly, it is estimated that the amount of sulfide ions adsorbed onto the iron anode surface is increased by increasing the $K_2S$ concentration, so that the adsorption force of the sulfide ions becomes higher. As a result, it is estimated that the discharge reaction of iron (elution reaction of iron) is inhibited, decreasing battery discharge reactivity.

It was found that by adding the discharge reaction promoter containing at least one kind of anion selected from the group consisting of $SCN^-$ anions, $S_2O_3^{2-}$ anions and $(CH_3)_2NCSS^-$ anions to the electrolyte, the discharge capacity of iron-air batteries can be stably increased without highly accurate concentration control. In particular, even if the concentration of the discharge reaction promoter in the electrolyte is more than 0.01 mol/L, stable battery discharge reactivity is obtained (that is, no decrease in discharge capacity). Therefore, the influence of variations in the concentration of the discharge reaction promoter at the time of electrolyte preparation, can be reduced. In addition, a decrease in discharge capacity in accordance with an increase in the concentration of the discharge reaction promoter due to a decrease in the electrolyte amount at the time of charge and discharge, can be inhibited. In particular, it was found that $Na_2S_2O_3$ has not only the discharge capacity stabilizing effect, but also is more effective in increasing discharge capacity than $K_2S$.

When $SCN^-$ anions, $S_2O_3^{2-}$ anions, $(CH_3)_2NCSS^-$ anions, combinations thereof, or the like are contained in the electrolyte, the anions more preferentially adsorb to the iron surface, compared to dissolved oxygen or the like in the electrolyte, and the anions serve as a chelant and promote iron dissolution. As a result, it is estimated that iron deposition on the anode surface due to excess iron ion saturation concentration (that is, re-passivation of iron) is inhibited, and the surface is kept in an active state.

The aqueous solution contains at least the discharge reaction promoter and an electrolyte compound.

The discharge reaction promoter is not particularly limited, as long as it contains at least one kind of anion selected from the group consisting of $SCN^-$ anions, $S_2O_3^{2-}$ anions and $(CH_3)_2NCSS^-$ anions. The discharge reaction promoter may contain $S_2O_3^{2-}$ anions.

Examples of cations that may be contained in the discharge reaction promoter include $Li^+$, $K^+$, $Na^+$, $Rb^+$, $Cs^+$ and $Fr^+$. In embodiments, the discharge reaction promoter may contain $K^+$ and/or $Na^+$. The cations that may be contained in the discharge reaction promoter are cations of a metal that is electrochemically more base than iron. Therefore, the cations are less reactive with the anode metal (iron) in the electrolyte. Therefore, it is considered that the cations are less likely to disturb preferential adsorption of the anions to the iron contained in the anode metal, which is for the promotion of discharge reaction.

Examples of the discharge reaction promoter include $Na_2S_2O_3$, NaSCN and $(CH_3)_2NCSSNa$. In embodiments, the discharge reaction promoter may be $Na_2S_2O_3$.

The concentration of the discharge reaction promoter in the electrolyte is not particularly limited. The content may be in a range of 0.005 mol/L to 0.1 mol/L.

The electrolyte compound is not particularly limited, as long as it is soluble in water and can offer desired ion conductivity. The electrolyte compound may be one that is able to make the aqueous solution neutral or basic. From the viewpoint of increasing electrode reactivity, the electrolyte compound may be one that is able to make the aqueous solution basic (i.e., pH>7).

The electrolyte compound may be one that contains at least one kind of metal selected from the group consisting of Li, K, Na, Rb, Cs, Fr, Mg, Ca, Sr, Ba and Ra. Examples of the electrolyte compound include LiCl, NaCl, KCl, $MgCl_2$, $CaCl_2$, LiOH, KOH, NaOH, RbOH, CsOH, $Mg(OH)_2$, $Ca(OH)_2$ and $Sr(OH)_2$. In embodiments, the electrolyte compound may be NaOH and/or KOH, or it may be KOH.

The concentration of the electrolyte compound is not particularly limited. The lower limit may be 0.01 mol/L or more, 0.1 mol/L or more, or 1 mol/L or more. The upper limit may be 20 mol/L or less, 10 mol/L or less, or 8 mol/L or less.

When the concentration of the electrolyte compound is less than 0.01 mol/L, the solubility of the anode metal may decrease. When the concentration of the electrolyte compound is more than 20 mol/L, the self-discharge of the iron-air battery is accelerated and may reduce battery characteristics.

The pH of the electrolyte may be 7 or more, 10 or more, or 14 or more.

2. Iron-Air Battery

The iron-air battery of the disclosed embodiments is an iron-air battery comprising an air electrode configured to receive an oxygen supply, an anode containing an iron element, and an electrolyte as set forth above, the electrolyte being in contact with the air electrode and the anode.

In the disclosed embodiments, the iron-air battery is a battery in which a reduction reaction of oxygen, which is an active material, is carried out in the air electrode; an oxidation reaction of iron is carried out in the anode; and ions are conducted by the electrolyte disposed between the air electrode and the anode. The iron-air battery of the disclosed embodiments may be a primary battery or secondary battery.

FIG. 1 is a sectional view of a schematic configuration of the iron-air battery according to one or more embodiments disclosed herein.

As shown in FIG. 1, an iron-air battery 10 includes an anode 11; an air electrode 12 disposed away from the anode 11; a separator 14 retaining an electrolyte 13 disposed between the anode 11 and the air electrode 12; an anode current collector 15 connected to the anode 11; an air electrode current collector 16 connected to the air electrode 12; and an outer casing 17 housing these members. The outer casing 17 is partly composed of a water repellent film 18. Using the water repellent film 18 at least in part prevents the electrolyte 13 from leaking from the outer casing 17.

The electrolyte 13 which is usable in the iron-air battery 10 of the disclosed embodiments will not be described here, since it is the same as the electrolyte 13 described above.

As needed, the iron-air battery 10 of the disclosed embodiments has the separator 14 for insulating the air electrode and the anode 11 from each other. From the viewpoint of retaining the electrolyte 13, the separator 14 may have a porous structure. The porous structure of the separator 14 is not particularly limited, as long as it can retain the electrolyte 13. Examples of the porous structure include a mesh structure in which constituent fibers are regularly arranged, a non-woven fabric structure in which constituent fibers are randomly arranged, and a three-dimensional network structure which has separate holes and connected holes. As the separator 14, conventionally-known separators can be used. Examples of the separator 14 include porous films made of polyethylene, polypropylene, polyethylene terephthalate, cellulose, etc., and non-woven fabrics such as a resin non-woven fabric and a glass fiber non-woven fabric.

The thickness of the separator 14 is not particularly limited. For example, it may be in a range of 0.1 to 100 μm.

The porosity of the separator 14 may be in a range of 30 to 90%, or it may be in a range of 45 to 70%. When the porosity is too small, the separator 14 has a tendency to disturb ion diffusion. When the porosity is too high, the strength of the separator 14 has a tendency to decrease.

The air electrode 12 contains at least an electroconductive material.

The electroconductive material is not particularly limited, as long as it has electroconductivity. Examples of the electroconductive material include a carbonaceous material, a perovskite-type electroconductive material, a porous electroconductive polymer and a metal body.

The carbonaceous material may be a porous or non-porous carbonaceous material. The carbonaceous material may be a porous carbonaceous material with a large specific surface area and that can provide many reaction sites. Examples of the porous carbonaceous material include mesoporous carbon. Examples of the non-porous carbonaceous material include graphite, acetylene black, carbon black, carbon nanotubes and carbon fibers.

The metal body may be composed of any known metal that is stable to the electrolyte. More specifically, the metal body may be a metal body in which a metal layer (coating film) containing at least one kind of metal selected from the group consisting of, for example, Ni, Cr and Al is formed on the surface, or a metal body which is wholly composed of a metal material that is made of at least one kind of metal selected from the group consisting of Ni, Cr and Al. The form of the metal body may be any known form such as a metal mesh, a perforated metal foil or a foam metal.

The content of the electroconductive material in the air electrode 12 may be in a range of 10 to 99% by mass, or it may be in a range of 50 to 95% by mass, when the total mass of the air electrode is determined as 100% by mass, for example.

The air electrode 12 may contain a catalyst for promoting an electrode reaction. The catalyst may be carried on the electroconductive material.

As the catalyst, any known catalyst having an oxygen reduction ability and being usable in iron-air batteries, can be appropriately used. Examples of the catalyst include at least one kind of metal selected from the group consisting of ruthenium, rhodium, palladium and platinum; a perovskite-type oxide containing a transition metal such as Co, Mn or Fe; a metal-coordinated organic compound having a porphyrin or phthalocyanine structure; an inorganic ceramic such as manganese dioxide ($MnO_2$) or cerium oxide ($CeO_2$); and a composite material made of a mixture of the above materials.

The content of the catalyst in the air electrode 12 may be in a range of 0 to 90% by mass, or it may be in a range of 1 to 90% by mass, when the total mass of the air electrode 12 is determined as 100% by mass, for example.

As needed, the air electrode 12 contains a binder for fixing the electroconductive material.

Examples of the binder include polyvinylidene fluoride (PVdF), polytetrafluoroethylene (PTFE) and styrene-butadiene rubber (SBR).

The content of the binder in the air electrode 12 is not particularly limited. The content may be in a range of 1 to 40% by mass, or it may be in a range of 10 to 30% by mass, when the total mass of the air electrode 12 is determined as 100% by mass, for example.

Examples of the method for producing the air electrode 12 include a method for mixing the above-described air electrode materials (such as the electroconductive material) and roll-pressing the mixture, and a method for applying a slurry containing the above-described air electrode materials and a solvent. Examples of the solvent used to prepare the slurry include acetone, ethanol and N-methyl-2-pyrrolidone (NMP). Examples of the method for applying the slurry include a spraying method, a screen printing method, a gravure printing method, a die coating method, a doctor blade method and an inkjet method. More specifically, the air electrode 12 can be formed by applying the slurry to the below-described air electrode current collector 16 or carrier film, drying the applied slurry, and then roll-pressing and cutting the dried slurry, as needed.

The thickness of the air electrode 12 may vary depending on the specific application of the iron-air battery 10, etc. For example, the thickness may be in a range of 2 to 500 μm, or it may be in a range of 30 to 300 μm.

As needed, the iron-air battery 10 of the disclosed embodiments has the air electrode current collector 16 for collecting current from the air electrode 12. The air electrode current collector 16 may be one having a porous structure or one having a dense structure, as long as it has desired electron conductivity. From the viewpoint of air (oxygen) diffusivity, it may be one having a porous structure such as a mesh structure. Examples of the form of the air electrode current collector 16 include a foil form, a plate form and a mesh (grid) form. The porosity of the air electrode current collector 16 having the porous structure is not particularly limited. For example, it may be in a range of 20 to 99%.

Examples of the material for the air electrode current collector 16 include metal materials such as stainless-steel, nickel, aluminum, iron, titanium, copper, gold, silver and palladium; carbonaceous materials such as carbon fiber and carbon paper; and highly electron conductive ceramic materials such as titanium nitride.

The thickness of the air electrode current collector 16 is not particularly limited. For example, it may be in a range of 10 to 1000 μm, or it may be in a range of 20 to 400 μm. The below-described outer casing 17 may also function as the air electrode current collector 16.

The air electrode current collector 16 may have a terminal that serves as a connection to the outside.

The anode 11 contains at least an anode active material.

Examples of the anode active material include an iron metal, an iron alloy, and an iron compound. Of them, the anode active material may be an iron metal.

Examples of the iron alloy include an alloy of iron and a metal material selected from the group consisting of vanadium, silicon, aluminum, magnesium, zinc and lithium. The metal constituting the iron alloy (that is, the metal other than iron) may be one or more kinds of metals.

Examples of the iron compound include FeO, $Fe_3O_4$, $Fe_2O_3$, FeOOH, $Fe(OH)_2$, $Fe(OH)_3$, iron(III) nitrate, iron(III)chloride oxide, iron(III) oxalate, iron(III) bromide and iron(III) iodide.

When the anode 11 is the iron metal, the purity of the iron is not particularly limited. For the element ratio of the iron contained in the iron metal, the lower limit may be 50% or more, 80% or more, 95% or more, or 99.5% or more. Also, the upper limit may be 100% or less, 99.999% or less, 99.99% or less, or 99.9% or less.

In the iron alloy, the content of the iron may be 50% by mass or more, when the total mass of the alloy is determined as 100% by mass.

The form of the anode 11 is not particularly limited.

Examples of the form include a plate form, a rod form, a particulate form and a mesh form. When the anode 11 is in a particulate form, the lower limit of the diameter of the particles may be 1 nm or more, may be 10 nm or more, or may be 100 nm or more, and the upper limit of the diameter of the particles may be 100 mm or less, may be 10 mm or less, or may be 1 mm or less.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

As needed, the anode 11 contains at least one of the electroconductive material and the binder for fixing the anode active material. For example, when the anode active material is in a plate form, the anode can be an anode that contains only the anode active material. On the other hand, when the anode active material is in a powder (particulate) form, the anode can be an anode that contains the anode active material and at least one of the electroconductive material and the binder. The type and amount of the electroconductive material used, the type and amount of the binder used, etc., can be the same as those of the air electrode described above.

As needed, the iron-air battery of the disclosed embodiments has the anode current collector 15 for collecting current from the anode 11. The material for the anode current collector 15 is not particularly limited, as long as it has electroconductivity. Examples of the material for the anode current collector 15 include stainless-steel, nickel, copper and carbon. Examples of the form of the anode current collector 15 include a foil form, a plate form and a mesh form. The thickness of the anode current collector 15 is not particularly limited. For example, the thickness may be in a range of 10 to 1000 μm, or it may be in a range of 20 to 400 μm. The below-described outer casing 17 may also function as the anode current collector 15.

The anode current collector 15 may have a terminal that serves as a connection to the outside.

The iron-air battery 10 of the disclosed embodiments generally has the outer casing 17 for housing the air electrode 12, the anode 11, the electrolyte 13, etc.

Examples of the form of the outer casing 17 include a coin form, a flat plate form, a cylindrical form and a laminate form.

The material for the outer casing 17 is not particularly limited, as long as it is stable to the electrolyte 13. Examples of the material for the outer casing 17 include a metal body that contains at least one selected from the group consisting of Ni, Cr and Al, and a resin such as polypropylene, polyethylene or acrylic resin. When the outer casing 17 is the metal body, the outer casing 17 may be such that only the surface is composed of the metal body, or such that the outer casing 17 is wholly composed of the metal body.

The outer casing 17 may be an open-to-the-atmosphere type or a hermetically-closed type. The open-to-the-atmosphere type outer casing has an opening for taking in oxygen from the outside (i.e., an oxygen inlet) and has a structure that allows at least the air electrode 12 to be in sufficient contact with the atmosphere. The oxygen inlet may be provided with an oxygen permeable film, a water repellent film, etc. The hermetically-closed type outer casing may have an oxygen (air) inlet tube and an outlet tube.

The water repellent film 18 is not particularly limited, as long as it is made of a material that does not leak the electrolyte 13 and allows the air to reach the air electrode 12. Examples of the water repellent film 18 include a porous fluorine resin sheet (such as PTFE) and water-repellent, porous cellulose.

An oxygen-containing gas is supplied to the air electrode 12. Examples of the oxygen-containing gas include air, dry air and pure oxygen. The oxygen-containing gas may be dry air or pure oxygen, or it may be pure oxygen.

EXAMPLES

The embodiments described herein will be further clarified by the following examples.

Example 1

First, an aqueous solution of 8 mol/L KOH (manufactured by Wako Pure Chemical Industries, Ltd.) was prepared. In a thermostatic bath (product name: LU-113; manufactured by: ESPEC Corp.), the aqueous solution was kept at 25° C. for 8 hours. Then, as a discharge reaction promoter, $Na_2S_2O_3$ (manufactured by Aldrich) was added to the aqueous solution at a concentration of 0.01 mol/L. Next, the aqueous solution was stirred with an ultrasonic washing machine for 15 minutes. Then, in the thermostatic bath, the aqueous solution was kept at 25° C. for 3 hours, thereby obtaining an electrolyte for iron-air batteries.

Example 2

An electrolyte for iron-air batteries was produced in the same manner as Example 1, except that as the discharge reaction promoter, $Na_2S_2O_3$ was added to the aqueous solution at a concentration of 0.05 mol/L.

Example 3

An electrolyte for iron-air batteries was produced in the same manner as Example 1, except that as the discharge reaction promoter, $Na_2S_2O_3$ was added to the aqueous solution at a concentration of 0.1 mol/L.

Example 4

An electrolyte for iron-air batteries was produced in the same manner as Example 1, except that as the discharge reaction promoter, NaSCN (manufactured by Aldrich) was added to the aqueous solution at a concentration of 0.005 mol/L.

Example 5

An electrolyte for iron-air batteries was produced in the same manner as Example 1, except that as the discharge reaction promoter, NaSCN was added to the aqueous solution at a concentration of 0.01 mol/L.

Example 6

An electrolyte for iron-air batteries was produced in the same manner as Example 1, except that as the discharge reaction promoter, NaSCN was added to the aqueous solution at a concentration of 0.05 mol/L.

Example 7

An electrolyte for iron-air batteries was produced in the same manner as Example 1, except that as the discharge reaction promoter, $(CH_3)_2NCSSNa$ (manufactured by Aldrich) was added to the aqueous solution at a concentration of 0.005 mol/L.

Example 8

An electrolyte for iron-air batteries was produced in the same manner as Example 1, except that as the discharge reaction promoter, $(CH_3)_2NCSSNa$ was added to the aqueous solution at a concentration of 0.01 mol/L.

Example 9

An electrolyte for iron-air batteries was produced in the same manner as Example 1, except that as the discharge reaction promoter, $(CH_3)_2NCSSNa$ was added to the aqueous solution at a concentration of 0.05 mol/L.

Comparative Example 1

An electrolyte for iron-air batteries was produced in the same manner as Example 1, except that a discharge reaction promoter was not added.

Comparative Example 2

An electrolyte for iron-air batteries was produced in the same manner as Example 1, except that as the discharge reaction promoter, $K_2S$ (manufactured by Aldrich) was added to the aqueous solution at a concentration of 0.01 mol/L.

Comparative Example 3

An electrolyte for iron-air batteries was produced in the same manner as Example 1, except that as the discharge reaction promoter, $K_2S$ was added to the aqueous solution at a concentration of 0.05 mol/L.

Comparative Example 4

An electrolyte for iron-air batteries was produced in the same manner as Example 1, except that as the discharge reaction promoter, $K_2S$ was added to the aqueous solution at a concentration of 0.1 mol/L.

[Evaluation of Discharge Reaction]

(Preparation of Electrodes)

As a working electrode, 0.8 g of steel wool (product name: BON STAR #0000; manufactured by: Nihon Steel Wool Co., Ltd.; filling rate: about 0.8%) was prepared. The steel wool was immersed in acetone and subjected to ultrasonic washing for 10 minutes.

As a counter electrode, a nickel mesh (product name: 100 mesh; manufactured by: Nilaco Corporation) cut into a size of 30 mm×30 mm×1 mm was prepared. A nickel ribbon was welded to the nickel mesh and used as a current collection wiring.

As a reference electrode, an Hg/HgO electrode was prepared.

(Production of Evaluation Cells)

The electrolytes of Examples 1 to 9 and Comparative Examples 1 to 4 were prepared (25 mL each).

Next, 13 cell containers (volume 30 mL each) were prepared. The number of the cell containers is equal to the total number of the electrolytes of Examples 1 to 9 and Comparative Examples 1 to 4. In each cell container, the working electrode, the counter electrode and the reference electrode were placed. The electrolytes (25 mL each) were separately put in the cell containers. The cell containers were capped to prevent volatilization, thereby producing evaluation cells. The production of the evaluation cells was carried out within 10 minutes.

(Measurement of Discharge Capacity)

The discharge capacities of the evaluation cells using the electrolytes of Examples 1 to 9 and Comparative Examples 1 to 4 were measured.

First, the working and counter electrodes of each evaluation cell were connected to a potentiostat/galvanostat (product name: VMP, manufactured by: Biologic). Then, before discharge, the potential of the working electrode was kept at −1.2 V (vs. Hg/HgO) for 10 minutes to reduce and remove an oxide layer on the iron surface of the working electrode. Then, a depressurization treatment was carried out for removal of hydrogen generated between the electrodes. Then, each cell was discharged at a discharge current of 23 mA. The discharge was continued until the potential of the working electrode reached 0 V (vs. Hg/HgO).

At the start of the discharge reaction, the potential of the working electrode was −0.9 V (vs. Hg/HgO); thereafter, through a first plateau and then a rapid potential increase, the potential of the working electrode reached about −0.7 V (vs. Hg/HgO). The discharge capacity of each cell was read therefrom. The measurement results of the discharge capacity (specific capacity) per unit mass of the anode active material are shown in Table 1.

TABLE 1

| | | | Discharge reaction promoting effect | |
|---|---|---|---|---|
| | Discharge reaction promoter | Content (mol/L) | Specific capacity (mAh/g) | Ratio to Comparative Example 1 |
| Example 1 | $Na_2S_2O_3$ | 0.01 | 120 | 13.3 |
| Example 2 | $Na_2S_2O_3$ | 0.05 | 132 | 14.7 |
| Example 3 | $Na_2S_2O_3$ | 0.1 | 121 | 13.4 |
| Example 4 | NaSCN | 0.005 | 39 | 4.3 |
| Example 5 | NaSCN | 0.01 | 54 | 6.0 |
| Example 6 | NaSCN | 0.05 | 46 | 5.1 |
| Example 7 | $(CH_3)_2NCSSNa$ | 0.005 | 80 | 8.9 |
| Example 8 | $(CH_3)_2NCSSNa$ | 0.01 | 65 | 7.2 |
| Example 9 | $(CH_3)_2NCSSNa$ | 0.05 | 73 | 8.1 |
| Comparative Example 1 | Not added | 0 | 9 | — |
| Comparative Example 2 | $K_2S$ | 0.01 | 101 | 11.2 |
| Comparative Example 3 | $K_2S$ | 0.05 | 13 | 1.4 |
| Comparative Example 4 | $K_2S$ | 0.1 | 1 | 0.1 |

As shown in Table 1, the specific capacities of the evaluation cells using the electrolytes of Examples 1 to 9 and Comparative Examples 1 to 4 are as follows: 120 mAh/g in Example 1; 132 mAh/g in Example 2; 121 mAh/g in Example 3; 39 mAh/g in Example 4; 54 mAh/g in Example 5; 46 mAh/g in Example 6; 80 mAh/g in Example 7; 65 mAh/g in Example 8; 73 mAh/g in Example 9; 9 mAh/g in Comparative Example 1; 101 mAh/g in Comparative Example 2; 13 mAh/g in Comparative Example 3; and 1 mAh/g in Comparative Example 4.

As is clear from Comparative Examples 2 to 4 in Table 1, in the case of using $K_2S$ as the discharge reaction promoter, a significant decrease in specific capacity is observed when the concentration of $K_2S$ in the electrolyte is more than 0.01 mol/L.

Meanwhile, for the discharge reaction promoters contained in Examples 1 to 9, it is clear that a certain level of specific capacities can be stably obtained even when the concentrations of the discharge reaction promoters contained in the electrolytes are more than 0.01 mol/L each.

As is clear from Table 1, the specific capacities of Examples 1 to 9 are 4.3 to 14.7 times higher than the specific capacity of Comparative Example 1. Also, it is clear that the specific capacities of Examples 1 to 3 using $Na_2S_2O_3$ are 1.19 to 1.31 times higher than the specific capacity of Comparative Example 2 using $K_2S$.

Therefore, it is clear that in the case of using $Na_2S_2O_3$, compared to the case of using $K_2S$, not only the discharge capacity is stable in spite of the $Na_2S_2O_3$ concentration, but also a higher discharge capacity is obtained.

The reason why the discharge capacity varies among the anion species is that the degree of the adsorption force of the anions to the iron metal surface or the formation state of defects in a layer of the anions adsorbing to the iron metal surface, varies among the anion species.

The invention claimed is:

1. An electrolyte for iron-air batteries having an anode containing an iron element, the electrolyte comprising:
   an aqueous solution comprising at least one kind of discharge reaction promoter selected from the group consisting of NaSCN, $Na_2S_2O_3$, and $(CH_3)_2NCSSNa$,
   wherein a concentration of the discharge reaction promoter is in a range of 0.005 mol/L to 0.1 mol/L.

2. The electrolyte for iron-air batteries according to claim 1, wherein the discharge reaction promoter is $Na_2S_2O_3$.

3. The electrolyte for iron-air batteries according to claim 1, wherein the aqueous solution is basic.

4. The electrolyte for iron-air batteries according to claim 1, wherein the aqueous solution comprises KOH as an electrolyte compound.

5. An iron-air battery comprising:
   an air electrode configured to receive an oxygen supply;
   an anode containing an iron element; and
   an electrolyte in contact with the air electrode and the anode, the electrolyte comprising:
   an aqueous solution comprising at least one kind of discharge reaction promoter selected from the group consisting of NaSCN, $Na_2S_2O_3$, and $(CH_3)_2NCSSNa$,
   wherein a concentration of the discharge reaction promoter is in a range of 0.005 mol/L to 0.1 mol/L.

6. The electrolyte for ion-air batteries according to claim 1, wherein the discharge reaction promoter is $(CH_3)_2NCSSNa$.

7. The iron-air battery according to claim 5, wherein the discharge reaction promoter is $Na_2S_2O_3$.

8. The iron-air battery according to claim 5, wherein the aqueous solution is basic.

9. The iron-air battery according to claim 5, wherein the aqueous solution comprises KOH as an electrolyte compound.

10. The iron-air battery according to claim 5, wherein the discharge reaction promoter is $(CH_3)_2NCSSNa$.

* * * * *

UNITED STATES PATENT AND TRADEMARK OFFICE
CERTIFICATE OF CORRECTION

PATENT NO. : 10,044,082 B2
APPLICATION NO. : 15/258487
DATED : August 7, 2018
INVENTOR(S) : Hiroshi Suyama, Kazushi Wakayama and Tomohiro Kuroki It is certified that error appears in the above-identified patent and that said Letters Patent is hereby corrected as shown below:

On the Title Page

Item (73), Assignee, delete "Toyota Jidosha Kabushiki Kaisha, Tokyo-shi (JP)" and insert --Toyota Jidosha Kabushiki Kaisha, Toyota-shi (JP)--, therefor.

Signed and Sealed this
Twenty-fifth Day of September, 2018

Andrei Iancu
*Director of the United States Patent and Trademark Office*